Patented Aug. 13, 1935

2,011,042

UNITED STATES PATENT OFFICE 2,011,042

LIQUID COATING COMPOSITION

Henry A. De Phillips, Jackson Heights, N. Y.

No Drawing. Application June 6, 1932, Serial No. 615,771

9 Claims. (Cl. 134—26)

This application relates to improvements in liquid coating compositions, and more particularly concerns a coating composition which is adapted for rigid or flexible bodies, and is characterized by a high degree of water resistance, heat resistance, weather resistance, and resistance to damage by bending or scratching.

One of the features of the present invention is the provision of a liquid coating composition which leaves upon the body treated a film of excellent adhesion, flexibility, insolubility and non-permeability to water, and of a high degree of stability and durability in service.

With these and other objects in view, the invention will be defined with respect to examples of practice thereof for particular purposes, but it will be understood that such examples are intended as illustrations and not as limitations upon the invention.

A liquid coating composition giving a clear, i. e. transparent film may be composed as follows:

Example 1

18% by weight of a 40% solution of chlorinated diphenyl compound in a solvent comprising two-thirds of xylol and one-third of petroleum thinner.

57% by weight of a 40% solution of a ketone acid condensate in a similar mixed solvent.

25% of additional petroleum thinner.

The chlorinated diphenyl compound is obtainable commercially as such: or may be produced by condensing benzol to diphenyl, and subjecting the latter to a chlorinating treatment. As a group, such chlorinated diphenyl compounds resist oxidation, are stable and do not polymerize under normal conditions. A form which has been found in practice to give excellent results is that known in commerce as "4465". It is a light amber-colored transparent resin with a softening point range of 70-75° C. (A. S. T. M.); a specific gravity of 1.7 at 25° C.; no flash point; no fire point; acidity less than 0.01 m. g. NaOH per gram of material.

The ketone acid condensate may, for example, be the resin produced by condensation of benzophenone-dicarboxylic acid and glycerine in the presence of various fatty acids, oils or natural resins. Such condensate resins are described in the Bruson Patents 1,807,503 and 1,813,838, as prepared by cooking benzophenone dicarboxylic acid in the presence of polyhydric alcohol, with the addition if desired of such acids, oils and resins. The quantity of petroleum thinner indicated has been found to give a proper liquidity for flow of the material when employed as a paint or lacquer; but this quantity may be adjusted according to the particular viscosity desired.

This composition is stable, and does not decompose spontaneously. It may be employed as a lacquer or enamel, and then dries within a short time to provide an "air-dry" film of great resistance to the penetration of water and the normally occurring aqueous solutions in general. It thus may be employed as a lacquer for wood, flexible fabrics, paper, etc. It is, however, also possible to bake this "air-dry" film in situ, for example, for one hour at 200° F. This baking appears to increase the polymerization occurring in the film, and to improve the gloss of the film, and definitely to result in a harder film of even greater wear resistance. It may be repeatedly washed with soap and water.

Example 2

For coating metal, such as for automobile bodies, ranges, refrigerator interiors and exteriors, cabinet surfaces, and other surfaces exposed to wear, weather and water, a composition such as the above may be admixed in the proportion of 400 grams of ferric oxide to 800 cc. of the above, and employed as a primer directly upon the metal. This primer adheres closely to the body, even upon nickel plating or glass. After air-drying for, say, one hour, this primer coating may be followed by surfacer coatings about one hour apart, in which the above material is used in the proportion of 800 cc. to around 780 grams of mixed pigments of the usual type. Finally, after air-drying for another hour, a finish coating comprising 800 cc. of the above with 300 grams of mixed titanium oxide and zinc oxide may be employed as an enamel. The whole is then baked for one hour at 200° F. The finished article is white and has a beautiful luster, is impervious and is insoluble with respect to water and soap solution, highly flexible, does not chip or act brittle upon impact or scratching, resists weathering and does not blush.

Although the diphenyl compound alone is rather reactive with many ordinary agents, and tends to form a brittle film which flakes upon impact or scratching; and the benzophenone-dicarboxylic acid condensation product itself produces a similar brittle film, yet the mixture of the two gives an excellent ribbon test and a sheet of metal coated therewith may be bent repeatedly without breakage or disruption of the film. This property is demonstrated by the film in the baked, as well as in the air-dry, condition.

In addition to the white enamel above, obviously an enamel of any other desired color may be obtained by employing suitable proportions of pigment matter, or of pigment and dye stuff.

In lieu of or in addition to the chlorinated diphenyl compound similar compositions may be made up by employing other natural or synthetic resins as well as various oils and acids. Thus, various synthetic resins, such as vinyl esters and their condensation products, glycerol-phthalic acid condensation products, phenol-formaldehyde condensation products, etc., may be employed, as well as the natural gums such as damar, kauri, estergum, etc., or modified natural or synthetic gums, etc. The cooked condensation products of cyclic compounds may be employed in such compositions, as they operate alone or in conjunction with the chlorinated diphenyl compound to produce a flexible and durable film. Particularly valuable products are obtained by using the condensation products of cyclic compounds such as cyclic pentane carboxylic acid, and cyclopentadiene and its compounds. By cooking such cyclic compounds, a stringy sticky mass is obtainable which upon addition to the ketone acid condensate operates to improve the flexibility and life of the resultant film. This mass may be cooked with benzo-phenone-dicarboxylic acid, for example, and employed in a solvent such as that above as the basis for a liquid coating composition.

In addition to such a composition, during the process or after manufacture, there may be incorporated animal, vegetable or mineral oils, fatty acids, and also other natural or synthetic resinous material. Thus, linseed oil, tung oil, high boiling petroleum oils, neat's-foot oil, and the like may be employed.

Thus, in Example 1 above, up to 30% of linseed oil may be incorporated, or 10% of palmitic acid, or 30% of colophony or similarly proportioned mixtures of these and like materials, and the resultant products are satisfactory for many employments.

Advantageous results may be gained by employing one of the para-coumarone or para-indene resins, in substantially the same proportion as indicated for the chlorinated diphenyl compound above. Such a mixture yields a film having an exceedingly high gloss when air-dried, with most of the properties maintained for Example 1.

The same proportion of gum damar can be substituted for the chlorinated diphenyl compound, which gives a film that can be air-dried to be glossy, or baked, but which is brittle unless modified with some non-volatile drying or non-drying oil, or similar material to impart improved flexibility.

The proportion above noted for the chlorinated diphenyl or similar resinous material may be varied from 10 to 40% approximately, under the conditions noted in example. Either too great or too little a proportion will result in a brittle coating which tends to scale or chip under impact or upon scratching.

While the composition has been described above in a particular example of employment of the ketone acid resinous compound with chlorinated diphenyl compound, it will be understood that the invention is not limited to this preferred additive material, but that other additive materials may be employed, such as the coating composition prepared by mixing 60 parts by weight of a 40% solution in a xylol-petroleum solvent of a ketone acid resinous compound with 40 parts by weight of a 40% solution of a synthetic glycerol-phthalic acid condensate resin.

The material so composed may likewise be employed as a liquid composition in the electrical industries. The coating of Example 1 may be so employed. In an actual test a di-electric varnish composition comprised: 60% of benzo-phenone-dicarboxylic acid modified glycerine resin solution (40% in mixed solvent as in Example 1); 40% chlorinated diphenyl solution (40% solution); with a proportion of 4 ounces of carbon black (such as that known commercially as "super-spectra-black") to the gallon. This gave an excellent smooth and shiny black film even upon porcelain insulating material, and which could be employed as it was, or following a baking at 200 degrees F. for one hour, or at a higher temperature for a longer or shorter time according to the necessities of other portions of the device being constructed.

The product can be employed to form films for many purposes, either clear, colored or pigmented, as a protective and/or decorative coating for metals, wood, paper, flexible fabrics such as fishing line, oil skins, etc., as a binder or di-electric in electric work, and in printing processes. When employed, for example, on flexible metal containers of the tubular extrusion type it is characterized by its conforming to the metal during squeezing without tendency to flake or chip. Such compositions lend themselves to employment in printing inks for various purposes, as for example, in engraving work, where the quick setting ability of the ingredients is of value in preventing offsetting.

Specimens which have been exposed to the standard accelerated weather test, are characterized by their extreme resistance to this test, far beyond the coatings commonly in use and still retain a high luster, impermeability to water, absence of brittleness, and strong adhesion.

It is obvious that the invention is not limited to the forms of execution set forth above, but that it may be employed in many ways within the scope of the appended claims.

Having thus described the invention, what I claim as new and desire to secure by Letters Patent, is:—

1. A liquid coating composition containing a condensate resin produced by cooking together a benzophenone dicarboxylic acid and a polyhydric alcohol, in mixture with chlorinated diphenyl, and a volatile solvent for the resin and chlorinated diphenyl, said resin and chlorinated diphenyl individually producing brittle films and the mixture thereof producing a flexible film.

2. A liquid coating composition containing a condensate resin produced by cooking together a benzophenone dicarboxylic acid and a polyhydric alcohol, in mixture with chlorinated diphenyl, in the proportion of 10 to 40 parts by weight of the resin to 90 to 60 parts by weight of the chlorinated diphenyl, and a volatile solvent for the resin and chlorinated diphenyl, said resin and chlorinated diphenyl individually producing brittle films and the mixture thereof producing a flexible film.

3. A liquid coating composition containing a condensate resin produced by cooking together a benzophenone dicarboxylic acid and a polyhydric alcohol, in mixture with chlorinated diphenyl, in the proportion of 18 parts by weight of the resin to 57 parts by weight of the chlorinated diphenyl, and a volatile solvent for the resin and chlorinated diphenyl, said resin and chlorinated diphenyl individually producing brittle films and the mixture thereof producing a flexible film.

4. A liquid coating composition as in claim 1, with which has been incorporated a non-volatile oil.

5. A liquid coating composition as in claim 1, with which has been incorporated pigment in the proportion of 300 to 800 grams to 800 cc. of the dissolved resin and chlorinated diphenyl.

6. A liquid coating composition as in claim 1, with which has been incorporated gum damar and a non-volatile oil.

7. A liquid coating composition as in claim 1, with which has been incorporated also a condensation product made by cooking cyclic pentane carboxylic acid.

8. A liquid coating composition as in claim 1, with which has been incorporated also a condensation product made by cooking a cyclopentadiene.

9. A liquid coating composition operative as a dielectric varnish of flexible nature, containing a condensate resin produced by cooking together a benzophenone dicarboxylic acid and a polyhydric alcohol, in mixture with chlorinated diphenyl, and a volatile organic solvent for the resin and chlorinated diphenyl.

HENRY A. DE PHILLIPS.